Patented Nov. 20, 1934

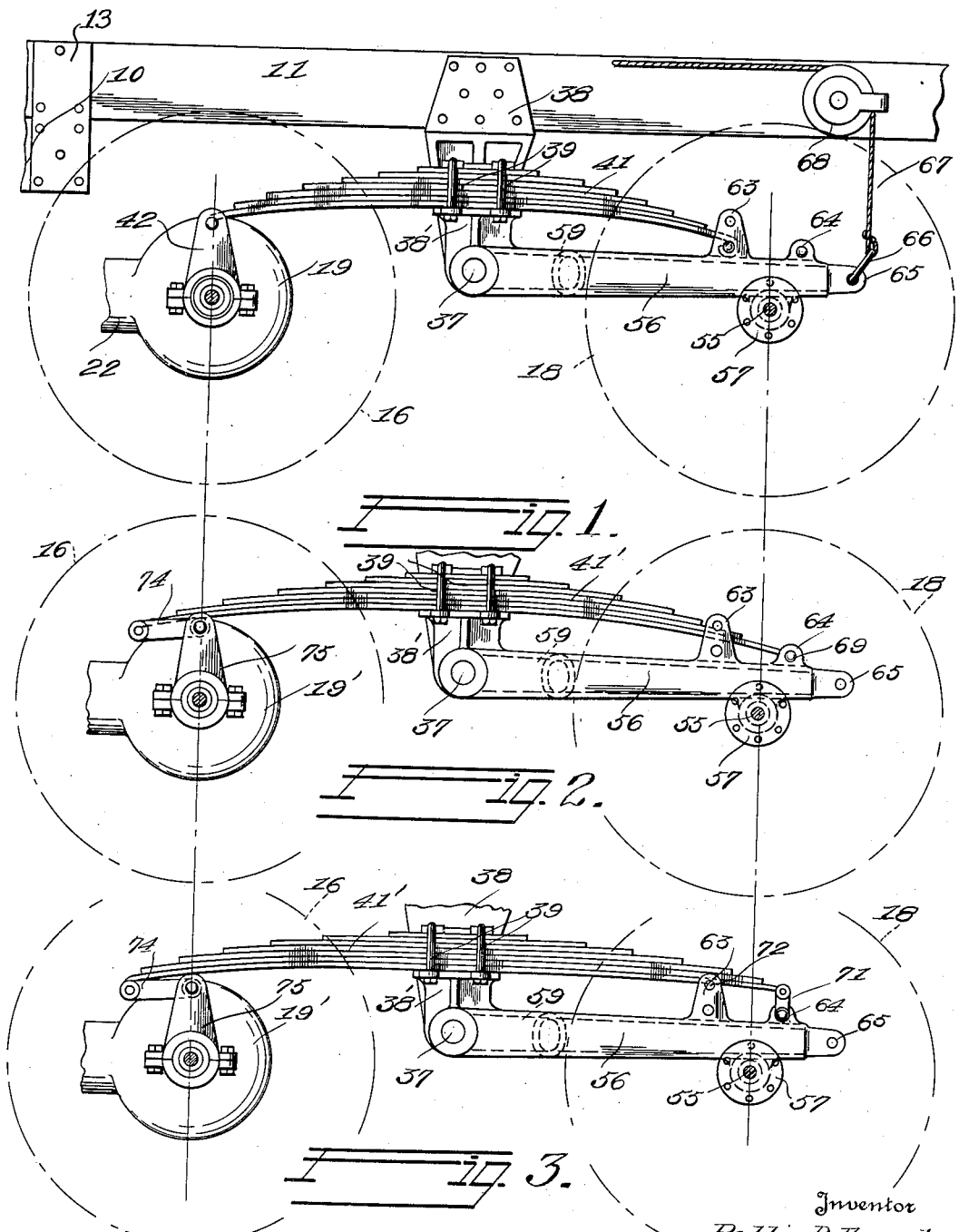

1,981,593

UNITED STATES PATENT OFFICE 1,981,593

MULTIWHEEL ROAD VEHICLE

Rollie B. Fageol, Los Angeles, Calif.

Application June 3, 1929, Serial No. 368,146

3 Claims. (Cl. 180—22)

This invention relates to multi-wheel road vehicles of the type that are constructed from an ordinary or standard vehicle having a single drive axle by the addition thereto of an extension frame and additional wheels, although the invention is capable of application to new constructions.

This invention aims to provide a thoroughly practical multi-wheel road vehicle construction that may be readily and cheaply produced by adding relatively few and simple parts to a two axle vehicle of standard construction to convert the standard vehicle into a vehicle having one end thereof supported by a truck construction consisting of four wheels and related parts. It is extremely desirable in converting a standard vehicle of the motor driven type into a motor driven vehicle having a multiplicity of wheels supporting the rear end thereof, that a construction be provided that may utilize as many as possible of the standard parts that enter into the construction of the standard vehicle, and to so design the construction that the added parts are of relative simplicity and few in number, without thereby in any manner sacrificing the advantages that are secured by a properly constructed multi-wheel road vehicle.

A still further object of the invention is to construct a multi-wheel vehicle from a standard vehicle chiefly by the addition thereto of standard parts commonly provided for the vehicle from which the multi-wheel vehicle is constructed.

A still further object of the invention is to provide a multi-wheel road vehicle in which a plurality of pairs of wheels are utilized to support one end of the frame of said vehicle, in which the wheels are connected together and to the frame in such manner as to provide a truck construction free to pivot about a trunnion extending transversely of the frame when the truck oscillates in moving over road irregularities, but in which the wheels are connected together in such manner that certain of the wheels on one side of the vehicle can rise and fall in moving over road irregularities without in any way effecting the oppositely disposed wheel on the other side of the vehicle frame, and without imposing substantial twisting strains upon the connection between the wheels and the springs and the other elements that connect them to the frame.

A still further object of the invention is to provide a multi-wheel road vehicle including a flexible truck construction arranged for pivotal movement about a single transverse trunnion shaft, in which only one pair of wheels is connected by a drive axle while the other pair is free to rise and fall with respect to each other and in which said other pair of wheels are positively guided with respect to said drive axle independently of the springs that resiliently resist their movement about the axis of said trunnion shaft, and in which springs of varying lengths may be readily used without other modification of the construction.

A still further object of the invention is to provide a multi-wheel road vehicle, including a flexible truck construction, arranged for pivotal movement about a transverse trunnion shaft, in which only one pair of wheels are connected by a drive axle while the other pair of wheels are free to rise and fall with respect to each other and in which said other pair of wheels are positively guided about the axis of said trunnion shaft independently of the springs that yieldably resist their movement about the axis of said trunnion shaft and in which twisting of the springs is substantially eliminated.

A still further object of the invention is to provide a multi-wheel road vehicle from a standard four wheel road vehicle by the addition of a pair of wheels to said vehicle, said pair of wheels being connected to an extension frame of said vehicle by means whereby different length standard spring assemblies may be readily utilized in the construction of multi-wheel road vehicles from standard four wheel road vehicles of different types so that parts provided for several differing constructions may be employed without difficulty and at low cost.

A still further object of the invention is to provide a multi-wheel road vehicle from a standard four wheel road vehicle by adding an extension to the frame of said standard vehicle and securing, to said frame extension, mechanism for providing a four wheel truck assembly for supporting said frame extension, said mechanism comprising a dead axle provided with a pair of wheels, spring assemblies detachably secured at corresponding ends thereof to said dead axle, said spring assemblies pivotally mounted intermediate their ends on a shaft adapted to be secured to said frame extension, opposite ends of said spring assemblies connected to the drive axle of said standard vehicle by rotatable means, and drag link connections between said rotatable means and the frame of said standard vehicle.

A still further object of the invention is to provide a multi-wheel road vehicle from a standard four wheel road vehicle by adding to said standard vehicle an axle supported by a pair of wheels and spring assemblies connected to said axle at corresponding ends thereof and adapted for connection at their opposite ends to the drive axle of said standard vehicle, said springs being pivotally connected intermediate their ends on a shaft adapted for support from an extension of the frame of said standard vehicle, said axle, springs, and spring pivoting means adapted for connection with the drive axle and frame of different types of standard vehicles whereby a multi-wheel vehicle may be readily constructed from any of different types of standard vehicles.

Still further objects of the invention will appear as a description thereof proceeds with reference to the accompanying drawing in which:

Figure 1 is a fragmentary side elevational view showing the rear end of a standard four wheel vehicle with the extension frame and conversion elements of the present invention in assembled relation.

Figure 2 is a view similar to Figure 1 showing a modified form of the present invention.

Figure 3 is a view similar to Figure 1 showing a still further modified form of the present invention.

Like reference characters designate like parts throughout the several figures.

The novel vehicle construction about to be described in the different embodiments thereof is particularly intended to be fabricated from an ordinary road vehicle of the motor driven type, in which the rear end thereof is supported on a single axle carried by a single pair of wheels. Standard vehicles of the type just referred to may be readily converted into multi-wheel road vehicles with their attendant advantages by the addition thereto of relatively few simple parts about to be described.

Referring to the drawing and first to Figure 1 in which is illustrated one of the embodiments of my invention, 10 designates the chassis frame of a standard road vehicle which is to be converted in the manner presently to be described into a multi-wheel road vehicle having a substantially longer wheel base. The longer wheel base is preferably secured by attaching to the frame 10 an extension frame 11. Frame 11 is secured in overlapped relation to frame 10 by any suitable means, as by metal plates 13 that are secured to the lapped longitudinal members 10 and 11, as is clearly indicated in Figure 1 of the drawing. This construction provides an extended chassis frame in which the rear end thereof is offset with respect to the longitudinal members 10 thus providing ample room in which the truck construction about to be described may freely oscillate as the vehicle moves over uneven roads. The rear end of the frame as shown is supported by a truck construction comprising two pairs of wheels 16 and 18. Wheels 16 support a drive axle housing 19 containing the usual differential and live axle sections operatively connected with the wheels 16. Said axle housing 19 is disposed rearwardly of the front axle (not shown) the same distance as in the standard construction and the axle sections within housing 19 are differentially driven by a standard drive shaft (not shown) extending longitudinally of the frame within the standard torque tube 22. The torque reactions on housing 19 are resisted by the torque tube 22 which is rigidly connected at one end thereof to housing 19 and at its other end to the frame by any suitable means (not shown).

Disposed transversely of the frame to the rear of housing 19 is a trunnion shaft 37 whose opposite ends are supported in brackets 38 secured to the exterior sides of frame 11 and depending from the frame a sufficient distance to bring the axis of said shaft substantially in the horizontal plane that contains the axes of rotation of all of the wheels under normal load conditions, as clearly indicated in Figure 1. The ends of the shaft 37 extend beyond the sides of frame 11.

Journalled on each projecting end of shaft 37 is a spring supporting bracket 38' to which is secured by clips or U-bolts 39, the mid portion of a leaf spring assembly 41, the arrangement being such that the spring assembly 41 will swing about the trunnion shaft 37 just referred to.

The opposite ends of the leaf spring assembly 41 at each side of the frame are utilized to yieldingly resist the vertical movement of the wheels relative to the frame. To this end, one end of each spring assembly 41 is pivotally connected to a shackle 42 which preferably has a universal or ball connection with axle housing 19 and the other end is pivotally secured to the supporting structure, provided for wheels 18, which will now be described.

Wheels 18 are rotatably secured to stub axles 55 which are fixed as by a pressed tapered fit adjacent the rear ends of hollow cast arms 56. The stub axles 55 are preferably provided with brake assembly mounts 57 adapted to have brake drums secured thereto, should it be desired to employ brakes on wheels 18.

The arms 56 are journaled on the center ends of trunnion shaft 37, in a manner well known in the art, thus providing for vertical swinging movement of arms 56 on shaft 37.

The spring supporting brackets 38' are integral with arms 56 and said arms are provided with integral longitudinally spaced pairs of spring terminal attaching ears 63 and 64, as well as terminal apertured extensions 65 for a purpose later referred to.

In Figure 1 is illustrated the rear portion of a multi-wheel road vehicle fabricated from a standard "Ford" vehicle construction, while in Figures 2 and 3 a similar multi-wheel road vehicle is illustrated fabricated from a standard "Chevrolet" vehicle construction which is provided with longer spring assemblies than the "Ford" construction and it will be seen by the parallel vertical dot and dash lines that stub axles 55 are of the same longitudinal spaced distance from housing 19 in Figure 5 and housings 19' in Figures 6 and 7 whereby the wheel base of the rear truck construction is the same in the multi-wheel road vehicle whether constructed from a standard "Ford" or "Chevrolet" vehicle.

As indicated in Figure 1 a multi-wheel vehicle construction is provided wherein spring assemblies 41 are secured intermediate their ends by the clips or U-bolts 39 to the brackets 38' integral with arms 56. The forward ends of the springs are shackled to housing 19 by ball connections and the rear ends of the springs are pivotally connected to pins projecting through apertures in ears 63 of arm 56 adjacent the bases of the ears, as indicated, the springs at this point of connection being provided with eyes having a plug fit on the pivot pins to permit elongation of the spring assemblies in yielding operation thereof.

In accordance with this form of the invention, the spring assemblies 41 are secured to brackets 38' substantially midway of their ends and it will be seen that due to ears 63 being disposed forwardly of stub axles 55 over half of the load on the truck assembly will be borne by the drive wheels 15 and 16 thus providing good traction.

In order to provide greater traction, means are provided to manually shift more of the load on drive wheels 16 by raising wheels 18 relative to frame 11. In order that this may be accomplished a clevis 66 is pivotally supported in the aperture in extension 65 to which is attached an end of a cable 67 passing over a pulley 68 mounted on extension frame 11 above the clevis 66. The cable is extended forwardly and may be wound upon any suitable drum, that may be provided with suitable lever and ratchet mechanism in order to raise wheels 18 from the ground or to shift a part of the load to drive wheels 16 in case of failure of traction.

In Figures 2 and 3 are illustrated the rear portions of multi-wheel vehicle constructions which may be fabricated from a standard vehicle construction utilizing standard spring assemblies 41' which are longer than the spring assemblies utilized in Figure 1.

Due to the difference in the length of the springs used on the different make vehicles illustrated, the ears 64 which are disposed rearwardly of ears 63 are utilized for attachment of the rear ends of the spring assemblies 41'. In the embodiment illustrated in Figure 2 the rear spring ends are loosely pivotally connected to pins 69 in ears 64 with the springs adjacent said ends extending between ears 63 while in the embodiment illustrated in Figure 3, the corresponding spring ends are shackled to ears 64 as indicated at 71 with the springs adjacent said ends supported on pins 72 projecting through apertures adjacent the other ends of ears 63 for supporting heavier loads. The front ends of the spring assemblies 41' in both embodiments as illustrated in Figures 2 and 3 are pivotally secured to the ends of forwardly and substantially horizontally projecting shackles 74 pivotally secured to brackets 75 secured to housing 19.

In accordance with this form of the invention a substantially flexible construction is provided as the front and rear pairs of wheels are permitted vertical oscillating movement about trunnion shaft 37 and the rear wheels 18 are permitted independent oscillating movement, resisted only by springs 41' which function to absorb shocks and vibrations.

By the provision of arms 56 provided with integral spring supporting brackets 38' and integral spring securing ears 63 and 64 as disclosed, relatively simple and inexpensive vehicle attachment means are provided by the utilization of which standard vehicles of different makes can readily be converted into multi-wheel vehicles comprising rear truck assemblies of uniform wheel base dimensions regardless of the variance in the length of the springs.

In accordance with the present invention a standard four-wheel vehicle construction can be readily converted into a multi-wheel vehicle construction by merely adding to the standard vehicle the integral unitary arms 56 having stub axles 55 and wheels 18 secured thereto. As wheels 18 may be of any standard construction, the only additional parts required for the conversion of a standard four wheel vehicle into a multi-wheel vehicle are the unitary arms 56 and wheels 18 together with cable 67 and actuating means therefor if required, thus making such conversion of vehicles a rather simple and inexpensive operation, particularly in view of the arms being adapted for use with various standard vehicle constructions and further in view of the fact that both the frame trunnion brackets and spring trunnion journals are interchangeable "Ford" and "Chevrolet" standard vehicle constructions.

Having disclosed certain specific embodiments of the invention it is to be understood that same are merely illustrative and not restrictive as the scope of the invention is to be determined from the subjoined claims and not from the foregoing specific disclosure.

What I claim as new and desire to secure by United States Letters Patents is:—

1. A multi-wheel road vehicle comprising a frame; a trunnion shaft extending transversely of said frame; an arm pivotally connected adjacent one end thereof to each end of said trunnion shaft; a drive axle disposed at one side of said trunnion shaft in parallel relation thereto; a set of drive wheels supporting said drive axle; non-driven wheels supporting said arms on the opposite side of said trunnion shaft; a leaf spring assembly at each side of the frame mounted to swing intermediate its ends about said trunnion shaft; said spring assemblies flexibly supported at corresponding ends thereof by said drive axle and flexibly supported at the opposite ends thereof by one of a plurality of pairs of ears on said arms.

2. The combination defined in claim 1 in which one pair of said ears is provided with a pair of vertically spaced apertures one pair of which apertures is adapted to receive a pin for pivotal connection of the adjacent end of said spring assembly, the other pair of said apertures adapted to receive a pin for supporting the intermediate portion of a longer spring assembly whose adjacent end is connected to the said other pair of ears.

3. The combination defined in claim 1 in which each of said arms is provided with a stub axle for supporting one of said non-driven wheels; said stub axle disposed in fixed spaced relation to said trunnion shaft and in which said pairs of ears are disposed in longitudinally spaced relation on said arms whereby a truck assembly for multi-wheel vehicles of uniform wheel base dimension may be constructed from different makes of standard four wheel vehicle constructions by utilizing the standard spring assemblies by connection of corresponding ends thereof to one or the other of said pairs of ears.

ROLLIE B. FAGEOL.